(12) United States Patent
Tandon et al.

(10) Patent No.: US 7,895,094 B2
(45) Date of Patent: Feb. 22, 2011

(54) GLOBAL ACCOUNT RECONCILIATION TOOL

(75) Inventors: Anju Tandon, New Delhi (IN); Akhila R. Jha, New Delhi (IN); Vandana Malik, New Delhi (IN); Anurag D. Dahiya, New Delhi (IN)

(73) Assignee: American Express Travel Related Services Company, Inc., New York, NY (US)

( * ) Notice: Subject to any disclaimer, the term of this patent is extended or adjusted under 35 U.S.C. 154(b) by 1969 days.

(21) Appl. No.: 10/736,181

(22) Filed: Dec. 15, 2003

(65) Prior Publication Data

US 2005/0177470 A1 Aug. 11, 2005

(51) Int. Cl.
*G07B 17/00* (2006.01)
*G07F 19/00* (2006.01)

(52) U.S. Cl. .................. 705/30; 705/39; 705/35; 705/40

(58) Field of Classification Search ........... 705/14, 705/30, 33, 7, 35, 1, 10, 2, 39; 707/1, 201; 235/379; 715/751
See application file for complete search history.

(56) References Cited

U.S. PATENT DOCUMENTS

| | | | | |
|---|---|---|---|---|
| 5,189,608 A * | 2/1993 | Lyons et al. | ............... | 705/30 |
| 5,327,555 A * | 7/1994 | Anderson | ............... | 707/201 |
| 5,392,390 A * | 2/1995 | Crozier | ............... | 715/751 |
| 5,978,779 A * | 11/1999 | Stein et al. | ............... | 705/37 |
| 6,182,279 B1 * | 1/2001 | Buxton | ............... | 717/100 |
| 6,195,794 B1 * | 2/2001 | Buxton | ............... | 717/108 |
| 6,687,677 B1 * | 2/2004 | Barnard et al. | ............... | 705/7 |
| 7,044,365 B2 * | 5/2006 | Witherspoon | ............... | 235/379 |
| 7,130,822 B1 * | 10/2006 | Their et al. | ............... | 705/35 |
| 7,155,398 B2 * | 12/2006 | Thier | ............... | 705/7 |
| 7,209,888 B2 * | 4/2007 | Frid-Nielsen et al. | ............... | 705/8 |
| 7,289,974 B2 * | 10/2007 | Godeby et al. | ............... | 707/1 |
| 2001/0051917 A1 * | 12/2001 | Bissonette et al. | ............... | 705/39 |
| 2003/0212615 A1 * | 11/2003 | Whitehead et al. | ............... | 705/30 |
| 2003/0229541 A1 * | 12/2003 | Randall et al. | ............... | 705/14 |
| 2004/0059597 A1 * | 3/2004 | Tkaczyk et al. | ............... | 705/2 |
| 2004/0064398 A1 * | 4/2004 | Browne et al. | ............... | 705/37 |
| 2004/0068550 A1 * | 4/2004 | Giannetti | ............... | 709/215 |
| 2004/0186760 A1 * | 9/2004 | Metzger | ............... | 705/7 |
| 2005/0044015 A1 * | 2/2005 | Bracken et al. | ............... | 705/30 |
| 2005/0080654 A1 * | 4/2005 | Huang et al. | ............... | 705/7 |
| 2005/0114239 A1 * | 5/2005 | Fiascone et al. | ............... | 705/30 |
| 2005/0149415 A1 * | 7/2005 | Furphy et al. | ............... | 705/30 |
| 2005/0177470 A1 * | 8/2005 | Tandon et al. | ............... | 705/30 |
| 2005/0182768 A1 * | 8/2005 | Waldorf et al. | ............... | 707/10 |
| 2007/0112653 A1 * | 5/2007 | Provinse | ............... | 705/30 |
| 2008/0319922 A1 * | 12/2008 | Lawrence et al. | ............... | 705/36 R |

OTHER PUBLICATIONS

Business Editors & Health/Medical Writers BIOWIRE2K. "Esoterix Launches EDI System: entriX." Business Wire Jul. 29, 2002 Business Dateline, ProQuest. Web. Oct. 4, 2010.*
Business/Technology Editors. "Scribe Software Announces Next-Generation Rapid Data Integration Software; Scribe Migrate and Scribe Integrate Will Simplify and Speed Data Integration Without Custom Programming :[1]." Business Wire Nov. 8, 1999 Business Dateline, ProQuest. Web. Oct. 4, 2010.*

* cited by examiner

*Primary Examiner*—Matthew S Gart
*Assistant Examiner*—Olusegun Goyea
(74) *Attorney, Agent, or Firm*—Snell & Wilmer L.L.P.

(57) ABSTRACT

A global reconciliation software tool is provided to standardize reconciliation processes across various corporate lines of business. The reconciliation tool provides standard templates for entering transaction and account data. In this manner, open accounting items are more readily identified and reconciled. The software tool includes a plurality of components allowing for greater scalability and operability across various computer systems and accounting programs.

14 Claims, 3 Drawing Sheets

GLOBAL ACCOUNT RECONCILIATION TOOL

FIELD OF THE INVENTION

This invention generally relates to financial data processing, and in particular, it relates to the reconciliation of financial accounts and transactions.

BACKGROUND OF THE INVENTION

Reconciliation is a common financial process by which debit and credit transactions are matched for a plurality of accounts. Typically, any unmatched or open transactions are researched and cleared by marking them for write off and the like in corporate reconciliation processes.

In large corporate organization having many lines of business, it is common for various departments to have adopted different computer accounting systems. Such accounting systems may differ in the computer operating system (OS) that is used and/or in the software applications that are employed.

While this does not pose a hardship for an individual department in reconciling its transactions internally, it frequently hampers reconciliations between departments having different accounting systems, and likewise for a corporate entity as a whole. One reason for this is because input financial data must be converted between the different data formats. Frequently, such conversions lead to further human or computer errors, which tend to increase un-reconciled transaction amounts. Also, a larger number of databases need to be used in corporations with disparate accounting systems, thus adding to the complexity of the task as well as the time it takes to complete reconciliations.

Another challenge faced with the multiple sources and formats of data is the difficulty in reconciling this data. Defining business rules/logic for allowing the system to automatch the data also becomes difficult. This leads to manual matching/reconciliation of data, which, in turn, causes further human errors and unmatched/unreconciled data. The burden of research and clearance increases with an increase in the volume of unreconciled data.

Replacing every accounting system in every department with a system of the same format would solve these recurring problems. However, particularly with respect to large corporations, this solution would entail extreme financial burdens. In addition, it may not be possible to find one available software solution that can be implemented within every department.

Accordingly, there is a need for a global reconciliation tool that addresses certain problems in existing technologies.

SUMMARY OF THE INVENTION

It is an object of the present disclosure, therefore, to introduce a globally deployable financial reconciliation tool for reconciling debit and credit transactions and improving Balance Sheet hygiene. The tool includes standardized templates for entering financial data. The standardized templates are operable on a plurality of operating systems and/or may interface with a plurality of accounting software applications. The capture functionality ensures flexibility to accept any input format of data. The tool also provides a plurality of functions for generating customized templates that may be used by individual corporate departments. The standardized templates and template-generating functions are then distributed to a plurality of remote terminals across all departments within a corporation.

All transaction and account data are captured and stored in one or more master financial databases. The captured financial data is then reconciled with the master financial data. Reconciliation of data is performed within the tool by an auto-match functionality, defining business rules to auto match data or by manual reconciliations. The user defined business rules can be reused for auto-matching across a plurality of data and accounts, which leads to higher auto-match by the tool and the need to manual reconciliation decreases. This ensures lesser manual errors and improved Balance Sheet hygiene. Any un-reconciled amounts are identified and the tool may generate reports of all reconciled and un-reconciled transactions. The tool may also be used to update corporate balance sheets and the like based on the reconciled and un-reconciled data.

In certain embodiments, the reconciliation tool has a component-based architecture in which each component implements a particular set of functions for accomplishing reconciliations. Such components may include a master component for storing master financial data for a plurality of accounts, a capture component for receiving and storing account and transaction data from a plurality of remote terminals, a matching component for matching the account and transaction data with the master financial data (either auto-match, creating business rules for auto-match or manual reconcilations) a clearance component for identifying reconciled and un-reconciled accounts or transactions, and an account component for updating account information and reporting reconciled and un-reconciled data.

BRIEF DESCRIPTION OF THE DRAWINGS

Further aspects of the present disclosure will be more readily appreciated upon review of the detailed description of its various embodiments, described below, when taken in conjunction with the accompanying drawings, of which.

DETAILED DESCRIPTION OF THE SPECIFIC EMBODIMENTS

Figure 1:
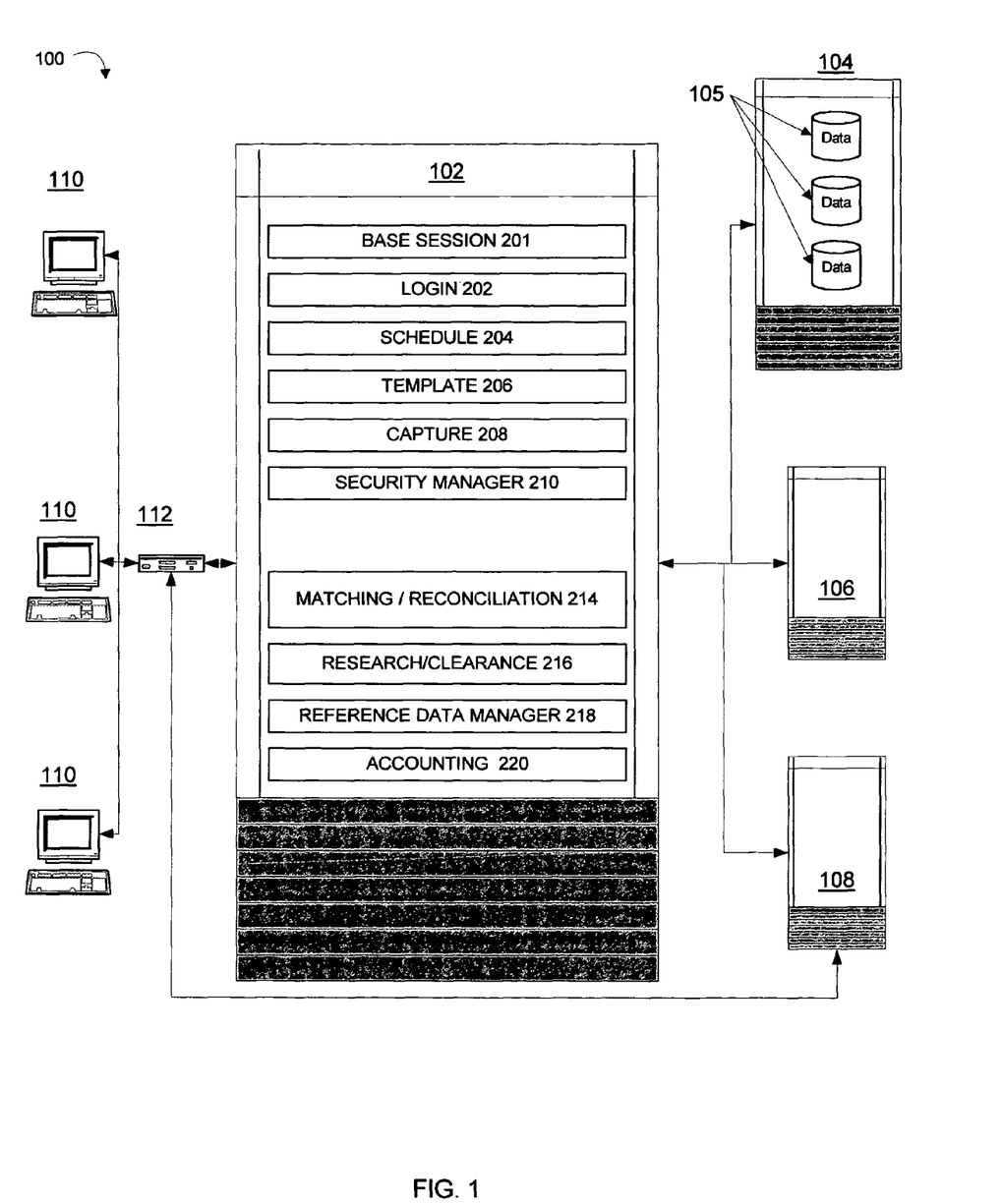
FIG. 1 is a schematic illustration of an exemplary corporate network for use with the present disclosure.
Figure 2:
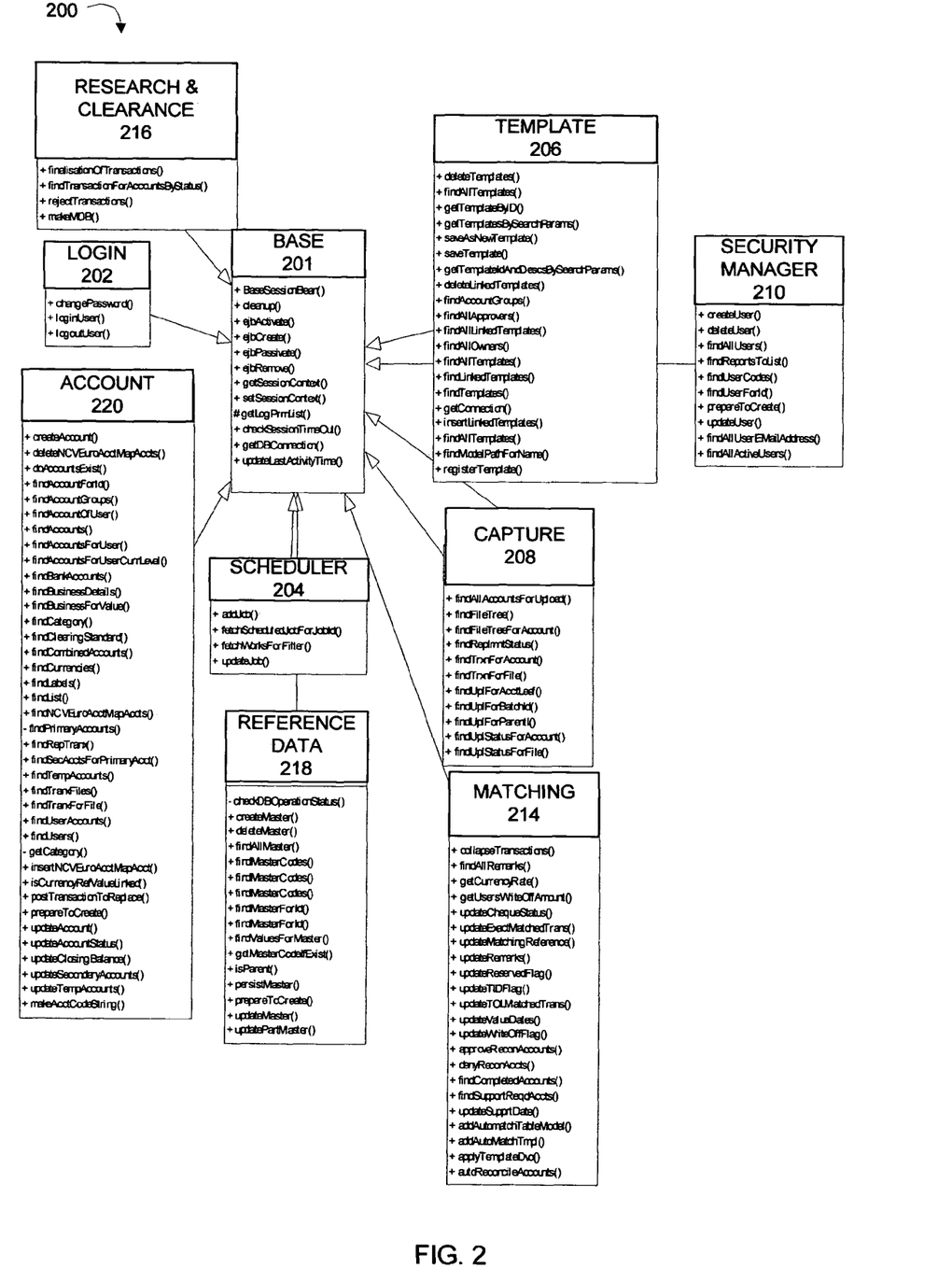
FIG. 2 is a schematic illustration of various exemplary components of a global reconciliation software tool of the present disclosure.
Figure 3:
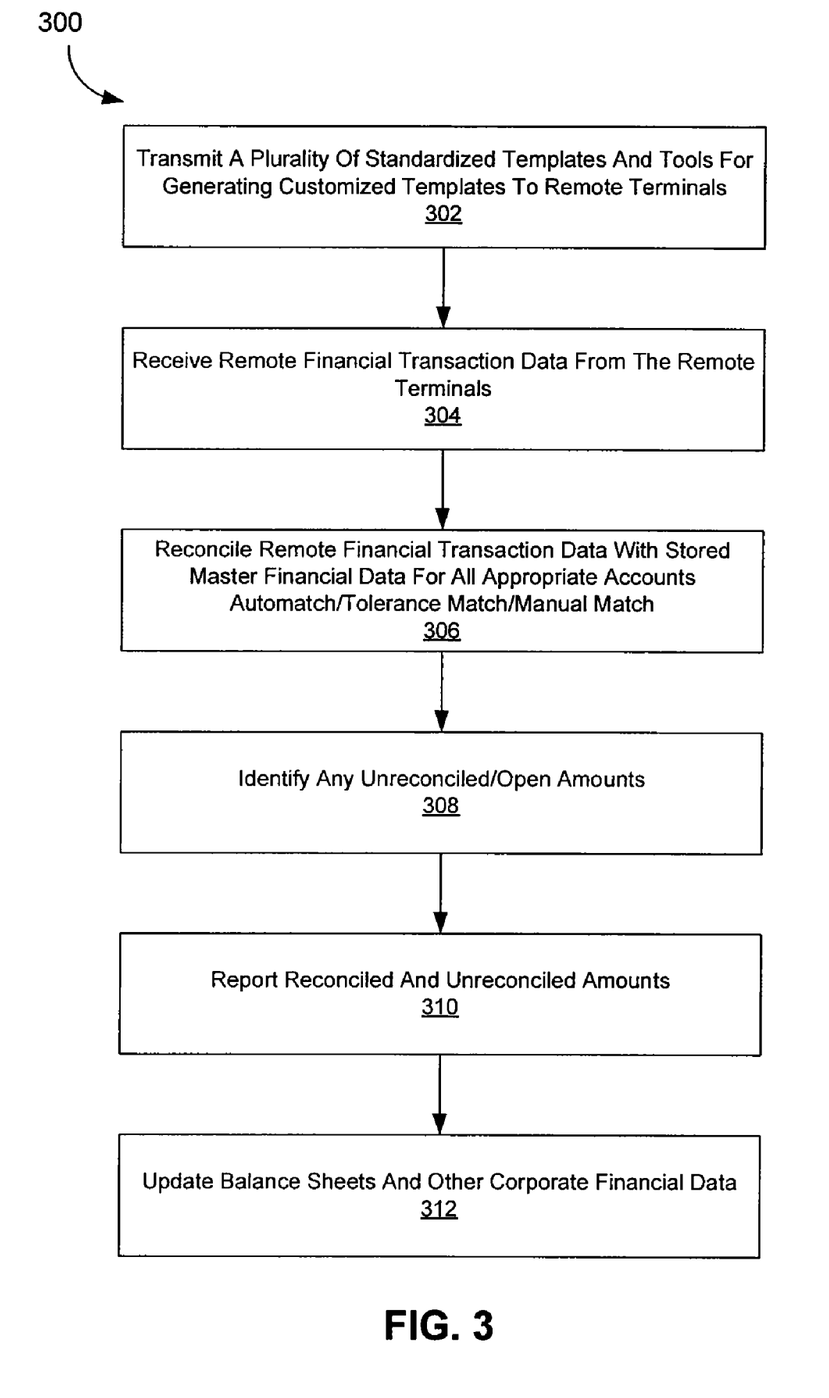
FIG. 3 is a flowchart of an exemplary reconciliation method performed by the global reconciliation software tool of FIG. 2.

Referring now to FIGS. 1-3, wherein similar components of the present disclosure are referenced in like manner, various embodiments of a global reconciliation tool will now be described in detail.

The global reconciliation tool was developed to address the problem of reconciliations being performed among various corporate departments using disparate computer accounting systems. Typically, responses to various technology implementation requests from these departments would have resulted in numerous disparate enhancements to each of the departments systems, thus forcing the systems to evolve in increasingly different directions. This in turn would lead to further complications in handling reconciliations among the departments.

However, by applying the Integrated Technology Quality Model developed by the assignee of the present application, the present global reconciliation tool has been developed and implemented as a corporate-wide solution. ITQM is described in detail in co-pending U.S. patent application Ser.

No. 10/682,705, entitled "Integrated Technology Quality Model" filed in the name of Huang et al. In accordance with ITQM, the global reconciliation tool provides a component-based architecture that supports the general principles of enhanced revenue generation, technology consumption management and optimization of technology investments.

The global reconciliation tool is a scalable, flexible, globally-deployable reconciliation preparation and reporting system. Its multi-tier, component-based architecture provides scalability to accommodate large volumes of financial data and flexibility to adapt to changing business needs. It ensures financial control in business areas by capturing the financial transactions at a common place, and reconciling and scrutinizing the transactions being captured. It enables rapid identification and reporting of any imbalance (or un-reconciled data) that may expose the business to undue financial losses. It also enables stronger balance sheet updating and reporting.

In various embodiments, the global reconciliation tool provides a plurality of standardized templates for entering transactional and account data. When developed appropriately, the standardized templates provide a standardized means for entering and submitting such financial information in format that complies with a corporation's general reconciliation policy, in place of or in conjunction with each department's data format required by their individual computer accounting system. These implementations, in turn, reduce the need for manual intervention in data input and review, thus enhancing corporate control of multi-department reconciliations.

The solution is designed in a very generic manner so that it can be deployed in any business area requiring reconciliation processes. The global reconciliation tool is operable on all popular computer operating system and thus facilitates moving and consolidating account data from existing disparate formats, such as NCR, MICROSOFT EXCEL and MICROSOFT ACCESS to a single common platform without requiring additional hardware replacement. The global reconciliation tool may serve as a replacement for departmental accounting software or may be developed to interface directly with a variety of accounting systems to convert financial data to a standard format. Thus, reconciliation preparation and reporting processes may be readily accommodated across various lines of business while minimizing technology replacement costs.

Flexible reporting capabilities provided by the global reconciliation tool reduces reconciliation turn-around time, thereby also lowering costs associated with this business process. It provides automated global transaction search and match capabilities in addition to manual matching capabilities, resulting in faster research and clearance of open items.

As a result of the foregoing, it should be readily appreciated that the global reconciliation tool is a cost-effective solution for upgrading corporate accounting software architecture and providing other accounting system enhancements.

Turning now to FIG. 1, there is depicted an exemplary embodiment of a computer network 100 through which the global reconciliation tool may be deployed and implemented. The exemplary computer network 100 may include the following components.

A accounting server 102 may be provided for deploying or hosting the global reconciliation tool across the network 100. The server 102 may store and process the various components 201-220 of a global reconciliation tool 200, as described below with respect to FIG. 2.

The server 102 may be any enterprise server, or group of servers, of the type manufactured by IBM, SUN and the like.

The accounting server 102 may also cooperate with one or more other servers 104-108 to accomplish the functionality described herein.

For example, one or more database servers 104 may be provided to store master financial data in one or more databases 105. The master financial data may thus be captured and recorded in any location for a large corporate entity. However, the master data may also be mirrored, or otherwise maintained, among several distributed databases and servers where desirable.

The accounting server 102 may also operate in conjunction with a backup server 106 that archives critical data and programming, and with a file and print server 108 that allows output of a variety of electronic or printed accounting reports.

The network 100 may also include one or more network gateways 112 for allowing communications between the servers 102-108 and a plurality of remote terminals 110. The communication may be performed over a secure communications layer to ensure security and prevent unauthorized access to financial data. The remote terminals 110 may be geographically or globally dispersed, and may operate as interface points with various corporate departments. The remote terminals 110 may also include point-of-sale terminals that conduct financial transactions. The remote terminals 110 may be operated by any corporate personnel, including authorized corporate users and administrators who may enter transaction data to the system or receive reports therefrom.

The computer network 100 may be implemented in any useful configuration and is not limited to that configuration shown in FIG. 1.

Turning now to FIG. 2, there is depicted various exemplary software components of a global reconciliation tool 200. As described above, the tool 200 includes various OS-independent software components for accomplishing the functions described herein. Accordingly, in certain embodiments, the various components of the global reconciliation tool 200 may be implemented as ENTERPRISE JAVABEAN (EJB) components that allow the tool to be interoperable on every OS and within any application environment. This is because JAVABEAN architecture connects via bridges into other widely-used computer component models, such as ACTIVE-X. The JAVABEAN specification defines a set of standard component software application programming interfaces (APIs) for the JAVA platform. Software components that use JAVABEAN APIs are thus compatible with a variety of containers including, but not limited to, INTERNET EXPLORER, VISUAL BASIC, MICROSOFT WORD, LOTUS NOTES. Formats other than JAVA, which are similarly OS- and application-independent, may also be used.

One embodiment of a global reconciliation tool 200 implemented as EJB components is shown in FIG. 2. In such an embodiment, the global reconciliation tool may include the following exemplary components.

A base session component 201 may be provided to coordinate computing sessions and data transfers among the plurality of components described herein. The base session component 201 may be implemented as a series of computer-controlled session initiation and maintenance processes.

A login component 202 may be provided to receive and validate authorized user login and password data to allow access to stored financial data.

A scheduler component 204 may be provided to schedule reconciliation sessions with remote terminals 110.

A template component 206 may be provided to provide a plurality of standardized templates to the remote terminals 110. The standardized templates may provide various fields for entering financial transaction and account data that may be captured and stored for later reconciliation at the accounting server 102. These templates are re-usable and assist in extracting relevant data from various remote files.

The template component 206 may also provide a plurality of functions that allow individual departments to generate department-specific or other customized templates for entering such data. The fields in such customized templates may be implemented such that they correspond to standard corporate transaction data types.

An capture review component 208 may be provided to review transaction data captured from various remote terminals 110 and to immediately identify any errors therein. Such errors may include un-reconcilable transaction amounts or the like. Errors may thus be immediately reported to appropriate remote terminals 110 to avoid later reconciliation errors. This component 208 may be provided with various functions for capturing financial data transmitted by various remote terminals 110. This component 208 offers flexibility to accommodate capture of data from standardized templates and also facilitates customized templates for different types of files. This component 208 also facilitates scheduling capture activities using templates, including the sequencing of capture, as well as capturing data manually.

A user maintenance component 210 may be provided to maintain, add, modify or delete authorized users, or user information of authorized users that may access the global reconciliation tool 200.

A matching component 214 may be provided for matching (reconciling) the data being captured in the system. This component 214 facilitates both manual and scheduled reconciliations. Scheduled reconciliation can be performed either using the pre-defined rules or by customized rules that may be defined by an authorized user.

A research and clearance component 216 may be provided with various functions for tracing the details of open (un-reconciled) items and facilitates generating clearing entries for those open items.

A master reference data component 218 may be for assembling and maintaining master financial data for a plurality of accounts.

An account reporting component 220 may be provided for publishing reconciliation activities in any desired manner. It may generate a set of predefined reports as an output of the data captured and reconciled within the system. Authorized users may be provided with further functions for designing customized reports for reporting the available data.

Turning now to FIG. 3, there is depicted an exemplary reconciliation process 300 performed by the accounting server 102 in conjunction with the global reconciliation software tool 200.

The process 300 includes transmitting a plurality of standardized templates and tools for generating customized templates to remote terminals 110 (step 302). The remote terminals 110, in turn, transmit financial transaction data for one or more accounts back to the accounting server 104 (step 304). The financial data received (either on a scheduled basis, or upon each transaction, or by manual implementation) from the remote terminals 110 is reconciled with stored master financial data (step 306). Any un-reconciled amounts are identified (step 308) and are reported in a desired output format (step 310). Un-reconciled transactions may then be researched and/or written off and corporate balance sheets and other accounting reports may be automatically updated (step 312). The process 300 may be repeated in various sessions on a recurring basis with a variety of remote terminals 100 during the continuing operation of a business entity.

Although the best methodologies of the invention have been particularly described in the foregoing disclosure, it is to be understood that such descriptions have been provided for purposes of illustration only, and that other variations both in form and in detail can be made thereupon by those skilled in the art without departing from the spirit and scope of the present invention, which is defined first and foremost by the appended claims.

What is claimed is:

1. A method, comprising:

transmitting, by a computer based system for managing financial data, a standardized template for capturing remote financial data and a customization tool to a plurality of remote terminals, wherein the standardized template is operable on a plurality of operating systems;

creating, by the computer based system, a customized template at the remote terminal, wherein the standardized template is customized with the customization tool to create a customized template, and wherein at least one of the standardized template and the customized template is associated with a financial data system at each of the remote terminals;

transmitting, by the computer based system, a request for financial data to the plurality of remote terminals, wherein each of the remote terminals extracts data from the financial data system to at least one the standardized template and the customized template, in response to the request for financial data, and wherein data from each of the remote terminals is extracted to at least one of the standardized template and the customized template at each of the remote terminals;

converting, by the computer based system, the remote financial data from a second format to a first format via the standardized template at a first remote terminal, wherein the first remote terminal stores remote financial data in the second format which is receivable by the standardized template;

converting, by the computer based system, the remote financial data from a third format to a first format via the customized template at a second remote terminal, wherein the second remote terminal stores remote financial data in the third format which is receivable by the customized template;

receiving, by the computer based system, the remote financial data from the plurality of remote terminals via the standardized template and the customized template, wherein the remote financial data is received in the first format;

matching, by the computer based system, the remote financial data from the standardized template and the customized template to master financial data based on a set of predetermined rules, wherein the master financial data is stored in a first format;

identifying, by the computer based system, an un-reconciled amount based on the matching;

analyzing, by the computer based system, the un-reconciled amount;

determining, by the computer based system, a classification of the un-reconciled amount;

transmitting, by the computer based system, a notification in response to the classification of the un-reconciled amount;

processing, by the computer based system, the un-reconciled amount based on the classification; and updating, by the computer based system, the master financial data based on the remote financial data.

2. The method of claim 1, wherein at least two of the remote terminals use different operating systems.

3. The method of claim 2, wherein at least two of the remote terminals use different accounting software applications.

4. The method of claim 3, further comprising updating a balance sheet based on the un-reconciled amount.

5. The method of claim 1, wherein the remote financial data includes a transaction involving an account, wherein and the master financial data includes a balance due for the account.

6. The method of claim 1, wherein the standardized template comprises a format that is independent of an operating system and an application.

7. The method of claim 1, the receiving further comprising scheduling, by the computer based system, a time for the receiving with the remote terminals.

8. The method of claim 6, further comprising transmitting, by the computer based system, to the remote terminals, a plurality of functions for generating customized templates for capturing the remote financial data.

9. The method of claim 1, further comprising maintaining, by the computer based system, identification data of users authorized to enter the remote financial data.

10. The method of claim 6, wherein the classification is at least one of write-off, further review required, and reconciled.

11. The method of claim 10, wherein the format of the standardized template is provided in JAVA format.

12. A tangible non-transitory computer-readable storage medium having computer-executable instructions stored thereon that, if executed by a computer based system for managing financial data, cause the computer based system to perform operations comprising:

transmitting, by the computer based system, a standardized template for capturing remote financial data and a customization tool to a plurality of remote terminals, wherein the standardized template is operable on a plurality of operating systems;

creating, by the computer based system, a customized template at the remote terminal, wherein the standardized template is customized with the customization tool to create a customized template for at least one of the remote terminals, and wherein at least one of the standardized template and the customized template is associated with a financial data system at each of the remote terminals;

transmitting, by the computer based system, a request for financial data to the plurality of remote terminals, wherein each of the remote terminals extracts data from the financial data system to at least one the standardized template and the customized template, in response to the request for financial data, and wherein data from each of the remote terminals is extracted to at least one of the standardized template and the customized template at each of the remote terminals;

converting, by the computer based system, the remote financial data from a second format to a first format via the standardized template at a first remote terminal, wherein the first remote terminal stores remote financial data in the second format which is receivable by the standardized template;

converting, by the computer based system, the remote financial data from a third format to a first format via the customized template at a second remote terminal, wherein the second remote terminal stores remote financial data in the third format which is receivable by the customized template;

receiving, by the computer based system, the remote financial data from the plurality of remote terminals via the standardized template and the customized template, wherein the remote financial data is received in the first format;

matching, by the computer based system, the remote financial data from the standardized template and the customized template to master financial data based on a set of predetermined rules, wherein the master financial data is stored in a first format;

identifying, by the computer based system, an un-reconciled amount based on the matching;

analyzing, by the computer based system, the un-reconciled amount;

determining, by the computer based system, a classification of the un-reconciled amount;

transmitting, by the computer based system, a notification in response to the classification of the un-reconciled amount;

processing, by the computer based system, the un-reconciled amount based on the classification; and updating, by the computer based system, the master financial data based on the remote financial data.

13. A computer based system for managing financial data comprising:

a network interface communicating with a memory;

the memory communicating with a processor; and the processor, when executing a computer program, is configured to:

transmitting, by the processor, a standardized template for capturing remote financial data and a customization tool to a plurality of remote terminals, wherein the standardized template is operable on a plurality of operating systems;

creating, by the processor, a customized template at the remote terminal, wherein the standardized template is customized with the customization tool to create a customized template for at least one of the remote terminals, and wherein at least one of the standardized template and the customized template is associated with a financial data system at each of the remote terminals;

transmitting, by the processor, a request for financial data to the plurality of remote terminals, wherein each of the remote terminals extracts data from the financial data system to at least one the standardized template and the customized template, in response to the request for financial data and wherein data from each of the remote terminals is extracted to at least one of the standardized template and the customized template at each of the remote terminals;

converting, by the processor, the remote financial data from a second format to a first format via the standardized template at a first remote terminal, wherein the first remote terminal stores remote financial data in the second format which is receivable by the standardized template;

converting, by the processor, the remote financial data from a third format to a first format via the customized template at a second remote terminal, wherein the second remote terminal stores remote financial data in the third format which is receivable by the customized template;

receiving, by the processor, the remote financial data from the plurality of remote terminals via the standardized template and the customized template, wherein the remote financial data is received in the first format;

matching, by the processor, the remote financial data from the standardized template and the customized template to master financial data based on a set of predetermined rules, wherein the master financial data is stored in a first format;

identifying, by the processor, an un-reconciled amount based on the matching;

analyzing, by the processor, the un-reconciled amount;

determining, by the processor, a classification of the un-reconciled amount;

transmitting, by the processor, a notification in response to the classification of the un-reconciled amount;

processing, by the processor, the un-reconciled amount based on the classification; and updating, by the processor, the master financial data based on the remote financial data.

14. The method of claim 1, wherein the customized template comprises a format that is independent of an operating system and an application.

* * * * *

UNITED STATES PATENT AND TRADEMARK OFFICE
CERTIFICATE OF CORRECTION

| | | |
|---|---|---|
| PATENT NO. | : 7,895,094 B2 | |
| APPLICATION NO. | : 10/736181 | |
| DATED | : February 22, 2011 | |
| INVENTOR(S) | : Anju Tandon et al. | |

It is certified that error appears in the above-identified patent and that said Letters Patent is hereby corrected as shown below:

In Column 6 Line 16 please delete "by the computer based system, a customized template at the remote terminal" and insert therefor --at the remote terminal a customized template--.

In Column 6 Line 25 please delete "wherein each of the remote terminals extracts data from the financial data system to at least one the standardized template and the customized template, in response to the request for financial data, and wherein data from each of the remote terminals is extracted to at least one of the standardized template and the customized template at each of the remote terminals"

In Column 6 after Line 31 please insert as a new paragraph --extracting financial data from the financial data system to at least one of the standardized template and the customized template at each of the remote terminals, in response to the request for financial data;--.

In Column 7 Line 29 please delete "if" and insert therefor --when--.

In Column 7 Line 32 please delete "the" and insert therefor --a--.

In Column 7 Line 37 please delete "by the computer based system, a customized template at the remote terminal" and insert therefor --at the remote terminal a customized template--.

In Column 7 Line 47 please delete "wherein each of the remote terminals extracts data from the financial data system to at least one the standardized template and the customized template, in response to the request for financial data, and wherein data from each of the remote terminals is extracted to at least one of the standardized template and the customized template at each of the remote terminals"

In Column 7 after Line 53 please insert as a new paragraph --extracting financial data from the financial data system to at least one of the standardized template and the customized template at each of the remote terminals, in response to the request for financial data;--.

Signed and Sealed this
Third Day of May, 2011

David J. Kappos
*Director of the United States Patent and Trademark Office*

CERTIFICATE OF CORRECTION (continued)

In Column 7 Line 54 please delete "by the computer based system"

In Column 7 Line 60 please delete "by the computer based system"

In Column 8 Line 28 please delete "transmitting, by the processesor" and insert therefor --transmit--.

In Column 8 Line 33 please delete "creating, by the processesor" and insert therefor --create--.

In Column 8 Line 40 please delete "transmitting" and insert therefor --transmit--.

In Column 8 Line 41 please delete "wherein each of the remote terminals extracts data from the financial data system to at least one the standardized template and the customized template, in response to the request for financial data and wherein data from each of the remote terminals is extracted to at least one of the standardized template and the customized template at each of the remote terminals"

In Column 8 after Line 48 please insert as a new paragraph --extract financial data from the financial data system to at least one of the standardized template and the customized template at each of the remote terminals, in response to the request for financial data;--.

In Column 8 Line 49 please delete "converting, by the processesor" and insert therefor --convert--.

In Column 8 Line 55 please delete "converting, by the processesor" and insert therefor --convert--.

In Column 8 Line 60 please delete "receiving" and insert therefor --receive--.

In Column 8 Line 64 please delete "matching" and insert therefor --match--.

In Column 9 Line 4 please delete "identifying" and insert therefor --identify--.

In Column 9 Line 6 please delete "analyzing" and insert therefor --analyze--.

In Column 9 Line 7 please delete "determining" and insert therefor --determine--.

In Column 9 Line 9 please delete "transmitting" and insert therefor --transmit--.

In Column 10 Line 1 please delete "processing" and insert therefor --process--.

In Column 10 Line 3 please delete "updating" and insert therefor --update--.